(12) United States Patent
Nara (10) Patent No.: US 8,322,862 B2
(45) Date of Patent: Dec. 4, 2012

(54) PROJECTOR, COMPUTER PROGRAM PRODUCT, AND TRAPEZOIDAL DISTORTION CORRECTING METHOD

(75) Inventor: Hiroshi Nara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 220 days.

(21) Appl. No.: 12/848,309

(22) Filed: Aug. 2, 2010

(65) Prior Publication Data

US 2011/0032492 A1 Feb. 10, 2011

(30) Foreign Application Priority Data

Aug. 4, 2009 (JP) ................................ 2009-181610

(51) Int. Cl.
*G03B 21/14* (2006.01)
(52) U.S. Cl. ............... 353/69; 353/30; 353/31; 353/70; 353/98; 353/99; 348/190; 348/222.1
(58) Field of Classification Search .................. 353/30, 353/31, 37, 47, 69, 70, 98, 99, 122; 348/222.1, 348/190, 191, 207.1, 383, 745, 806, E5.138, 348/E9.027; 349/5, 7, 8, 9, 116
See application file for complete search history.

(56) References Cited

U.S. PATENT DOCUMENTS

| | | | |
|---|---|---|---|
| 6,753,907 B1 * | 6/2004 | Sukthankar et al. ........ | 348/222.1 |
| 6,846,081 B2 * | 1/2005 | Mochizuki et al. ............. | 353/70 |
| 6,877,863 B2 * | 4/2005 | Wood et al. ...................... | 353/70 |
| 7,036,940 B2 * | 5/2006 | Matsuda et al. ................. | 353/70 |
| 7,347,564 B2 | 3/2008 | Matsumoto et al. | |
| 7,470,029 B2 * | 12/2008 | Kobayashi ...................... | 353/69 |
| 7,537,350 B2 | 5/2009 | Kobayashi et al. | |
| 7,753,534 B2 * | 7/2010 | Kuno ............................... | 353/69 |
| 7,808,513 B1 * | 10/2010 | Teng .............................. | 345/647 |
| 8,011,789 B2 * | 9/2011 | Murata ........................... | 353/69 |
| 8,162,487 B2 * | 4/2012 | Ofune et al. ..................... | 353/70 |
| 2003/0223048 A1 * | 12/2003 | Kimura ........................... | 353/70 |
| 2004/0041985 A1 * | 3/2004 | Kimura et al. ................... | 353/70 |
| 2006/0203207 A1 * | 9/2006 | Ikeda et al. ..................... | 353/70 |

FOREIGN PATENT DOCUMENTS

| | | | |
|---|---|---|---|
| JP | 2005-286572 A | 10/2005 | |
| JP | 2006-060447 A | 3/2006 | |

* cited by examiner

*Primary Examiner* — Georgia Y Epps
*Assistant Examiner* — Sultan Chowdhury
(74) *Attorney, Agent, or Firm* — AdvantEdge Law Group, LLC (57) ABSTRACT

A projector includes: a storing unit that stores setting data indicating a manual trapezoidal distortion correction system selected out of plural kinds of manual trapezoidal distortion correction systems; an operation unit that generates operation information; an imaging unit that picks up an image of a projection target area and generates a pickup image; an automatic trapezoidal distortion correction unit that performs automatic trapezoidal distortion correction; a projecting unit that projects, after the automatic trapezoidal distortion correction is performed, irrespectively of the manual trapezoidal distortion correction system indicated by the setting data, an adjustment instruction image for urging adjustment of a vertex position of a display planned area of the image in the projection target area; and a manual trapezoidal distortion correction unit that performs manual trapezoidal distortion correction on the basis of operation information indicating an adjustment instruction for the vertex position.

7 Claims, 10 Drawing Sheets

- PLEASE SET A PROJECTOR TO PLACE THIS MESSAGE BOX IN THE CENTER OF A SURFACE ON WHICH THIS MESSAGE BOX IS PROJECTED.
- WHEN PROJECTING THIS MESSAGE BOX ON THE SCREEN, PLEASE PERFORM ZOOM ADJUSTMENT SUCH THAT AN AREA SURROUNDED BY THE OUTER LINE IS LARGER THAN THE SCREEN.

WHEN PREPARED, PLEASE PRESS THE "EASY SETUP" BUTTON.

[EASY SETUP]: EXECUTE         [RETURN]: STOP

PROJECTOR, COMPUTER PROGRAM PRODUCT, AND TRAPEZOIDAL DISTORTION CORRECTING METHOD

CROSS-REFERENCE

The present application claims priority from Japanese Patent Application No. 2009-181610 filed on Aug. 4, 2009, which is hereby incorporated by reference in its entirety.

BACKGROUND

As a system for a projector to perform trapezoidal distortion correction (also referred to as trapezoid correction, keystone correction, and the like), for example, the following systems are proposed: a system for a user to designate a desired vertex among four vertexes of an image and adjust a vertex position as described in Japanese Patent Publication No. 2005-286572; a system for detecting a frame of a screen in a pickup image and adjusting the pickup image according to the frame as described in Japanese Patent Publication No. 2006-60447; and a system for pressing up, down, left, and right buttons of a projector main body to adjust distortion in a trapezoidal shape.

For example, a projector is proposed that adopts a system for a user to press, when succeeding in detection of a frame of a screen, up, down, left, and right buttons of a projector main body after automatic trapezoidal distortion correction corresponding to the frame to thereby perform manual trapezoidal distortion correction in the system for designating a desired vertex among four vertexes of an image and adjusting a vertex position and press, when failing in the detection, the up, down, left, and right buttons of the projector main body to thereby perform the manual trapezoidal distortion correction in the system for adjusting distortion in a trapezoidal shape.

However, the system is a system for performing trapezoidal distortion correction in the different systems, although the same operation buttons are pressed. Therefore, in some case, the user is confused.

SUMMARY

Various embodiments may provide a projector, a computer program product, an information storage medium, and a trapezoidal distortion correcting method that enable a user to more easily perform trapezoidal distortion correction manually after automatic trapezoidal distortion correction.

According to at least one embodiment of the disclosure, there is provided a projector including: a storing unit that stores setting data indicating a manual trapezoidal distortion correction system selected out of plural kinds of manual trapezoidal distortion correction systems when manual trapezoidal distortion correction is instructed; an operation unit that generates operation information; an imaging unit that picks up an image of a projection target area and generates a pickup image; an automatic trapezoidal distortion correction unit that performs automatic trapezoidal distortion correction on the basis of operation information indicating an automatic trapezoidal distortion correction instruction and the pickup image; a projecting unit that projects, after the automatic trapezoidal distortion correction is performed, irrespectively of the manual trapezoidal distortion correction system indicated by the setting data, an adjustment instruction image for urging adjustment of a vertex position of a display planned area of the image in the projection target area on the projection target area; and a manual trapezoidal distortion correction unit that performs manual trapezoidal distortion correction on the basis of operation information indicating an adjustment instruction for the vertex position.

According to at least one embodiment of the disclosure, there is provided a computer program product embodied in at least one computer readable medium and comprising computer instructions executable by a computer of a projector, which controls a storing unit, an imaging unit, and a projecting unit, to perform the function of: causing the storing unit to store setting data indicating a manual trapezoidal distortion correction system selected out of plural kinds of manual trapezoidal distortion correction systems when manual trapezoidal distortion correction is instructed; causing the imaging unit to pick up an image of a projection target area and generate a pickup image; performing automatic trapezoidal distortion correction on the basis of operation information indicating an automatic trapezoidal distortion correction instruction and the pickup image; causing the projecting unit to project, after the automatic trapezoidal distortion correction is performed, irrespectively of the manual trapezoidal distortion correction system indicated by the setting data, an adjustment instruction image for urging adjustment of a vertex position of a display planned area of the image in the projection target area on the projection target area; and performing manual trapezoidal distortion correction on the basis of operation information indicating an adjustment instruction for the vertex position.

According to at least one embodiment of the disclosure, there is provided a trapezoidal distortion correcting method for a computer of a projector, which controls a storing unit, an imaging unit, and a projecting unit, the method including: allowing the computer of a projector to cause the storing unit to store setting data indicating a manual trapezoidal distortion correction system selected out of plural kinds of manual trapezoidal distortion correction systems when manual trapezoidal distortion correction is instructed; allowing the computer to cause the imaging unit to pick up an image of a projection target area and generate a pickup image; allowing the computer to perform automatic trapezoidal distortion correction on the basis of operation information indicating an automatic trapezoidal distortion correction instruction and the pickup image; allowing the computer to cause the projecting unit to project, after the automatic trapezoidal distortion correction is performed, irrespectively of the manual trapezoidal distortion correction system indicated by the setting data, an adjustment instruction image for urging adjustment of a vertex position of a display planned area of the image in the projection target area on the projection target area; and allowing the computer to perform manual trapezoidal distortion correction on the basis of operation information indicating an adjustment instruction for the vertex position.

According to the embodiments, the projector performs, irrespectively of the manual trapezoidal distortion correction system indicated by the setting data, adjustment of the vertex position of the display planned area to thereby enable a user to manually perform trapezoidal distortion correction. Consequently, the user can more easily perform the trapezoidal distortion correction manually after the automatic trapezoidal distortion correction.

The projecting unit may project a guidance image for urging check of a location of the projector on the projection target area before the imaging by the imaging unit is performed.

Consequently, the projector can perform the trapezoidal distortion correction in an appropriate location by causing the user to check the location of the projector before the trapezoidal distortion correction.

The projector may include a control unit, the projecting unit may project a focus adjustment image on the projection target area before the projection of the guidance image, and the control unit may cause the projecting unit to perform focus adjustment on the basis of the focus adjustment image included in the pickup image.

Consequently, the projector can project the guidance image in a state in which a focus is adjusted. Therefore, the projector can more appropriately give the user a guidance.

The focus adjustment image may include at least one pattern image having at least three different gradations and the control unit may cause the projecting unit to perform the focus adjustment on the basis of a three-dimensional coordinate of at least one point concerning the pattern image included in the pickup image.

Consequently, since the image having at least three different gradations is included in the pickup image, the projector can easily determine a reference point, which is a reference for a projection distance or the like, from the difference among the gradations even in a state in which a focus of the pickup image is inappropriate. Therefore, the focus adjustment can be performed in a shorter time and with higher accuracy.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

Embodiments in which the invention is applied to a projector are explained below with reference to the accompanying drawings. The embodiments explained below by no means limit the content of the invention described in claims. All components described in the embodiments are not always essential as solving means of the invention described in claims.

First Embodiment

Figure 1A:
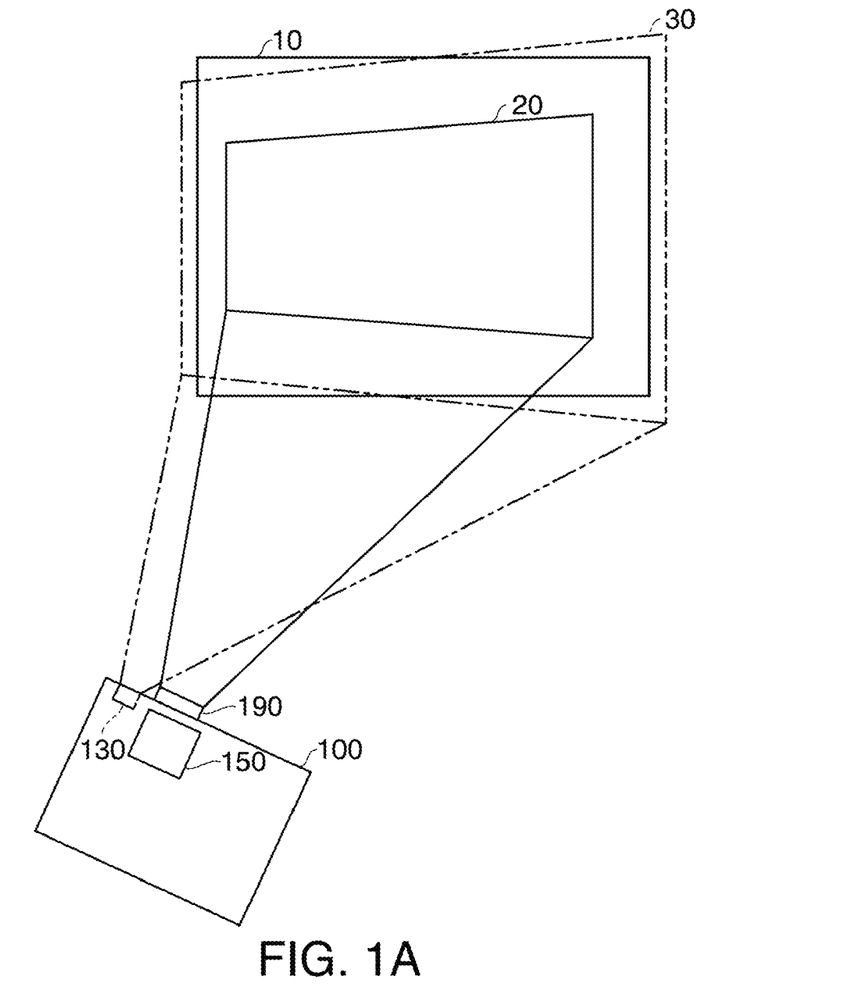
FIG. 1A is a diagram of an image projection state in a first embodiment.
Figure 1B:
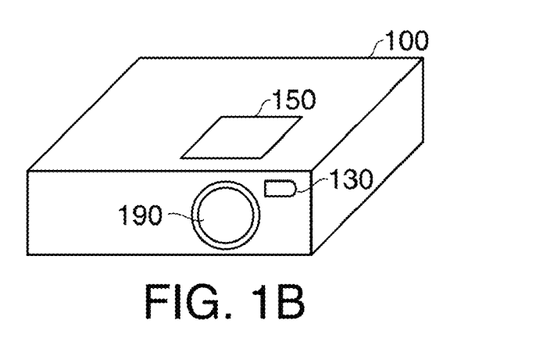
FIG. 1B is a perspective view of a projector in the first embodiment.

FIG. 1A is a diagram of an image projection state in a first embodiment. FIG. 1B is a perspective view of a projector in the first embodiment. A projector 100 has a function of projecting an image 20 on a screen 10, which has a projection target area, and picking up, using an imaging unit 130, an image of an imaging range 30 including the image 20 projected on the screen 10.

When a user sets the projector 100 of a portable type, the user manually performs trapezoidal distortion correction after performing automatic trapezoidal distortion correction by pressing a predetermined button provided in an operation unit 150 of a main body of the projector 100 or a predetermined button provided in a remote controller for giving an instruction to the projector 100. In this embodiment, such a predetermined button for giving an instruction is referred to as correction button.

Figure 2:
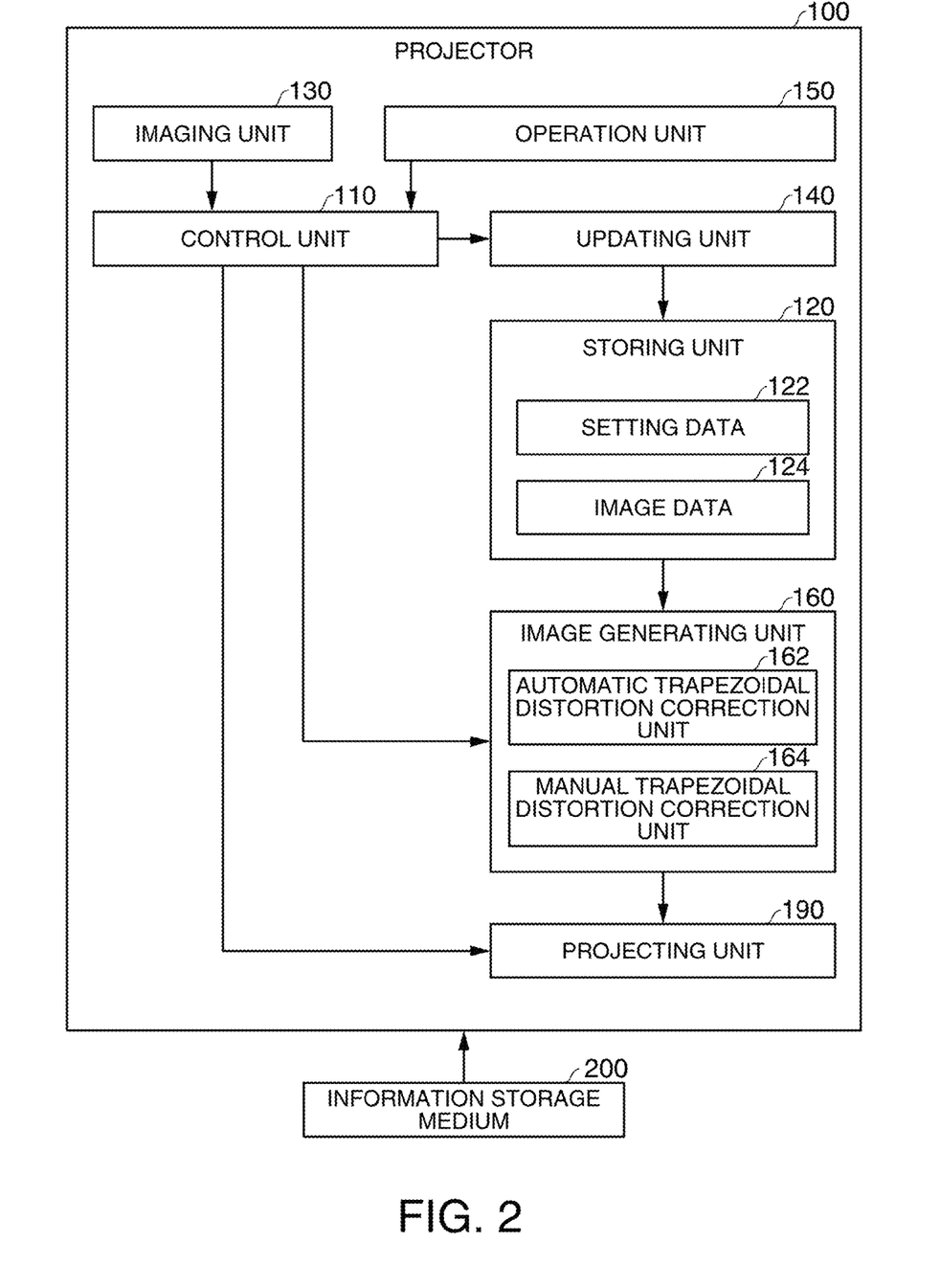
FIG. 2 is a functional block diagram of the projector in the first embodiment.

Functional blocks of the projector 100 having such functions are explained below. FIG. 2 is a functional block diagram of the projector 100 in the first embodiment. The projector 100 includes a control unit 110 that performs various kinds of control, a storing unit 120 that stores various data, an imaging unit 130, an updating unit 140 that updates the data, an operation unit 150 that generates operation information according to button operation or the like, an image generating unit 160 that generates an image, and a projecting unit 190 that projects the image.

The storing unit 120 has stored therein, for example, setting data 122 indicating a manual trapezoidal distortion correction system selected out of plural kinds of manual trapezoidal distortion correction systems when manual trapezoidal distortion correction is instructed and image data 124 for generating an image.

In this embodiment, two kinds of systems are adopted as the manual trapezoidal distortion correction system. The first system is a system for the user to press up, down, left, and right buttons of the main body of the projector 100 or the like to thereby adjust distortion in a trapezoidal shape. The second system is a system for the user to press the up, down, left, and right buttons to thereby designate a desired vertex among four vertexes of an image and adjust a vertex position. In this embodiment, it is assumed that the user selects the first system such that the first system is executed when manual trapezoidal distortion correction is instructed. For example, when the user performs button operation for instructing the manual trapezoidal distortion correction, the projector 100 projects an image for the user to press the up, down, left, and right buttons to thereby adjust distortion in a trapezoidal shape in the vertical direction or the horizontal direction.

The image generating unit 160 includes an automatic trapezoidal distortion correction unit 162 that performs the automatic trapezoidal distortion correction on the basis of operation information indicating the automatic trapezoidal distortion correction instruction and a pickup image and a manual trapezoidal distortion correction unit 164 for performing, irrespectively of the manual trapezoidal distortion correction system indicated by the setting data 122, the manual trapezoidal distortion correction on the basis of operation information indicating an adjustment instruction for a vertex position.

The projector 100 may function as these units using hardware explained below. For example, in the projector 100, a CPU or the like may be used as the control unit 110 and the updating unit 140, a nonvolatile memory or the like may be used as the storing unit 120, a CCD camera, a CMOS camera, or the like may be used as the imaging unit 130, operation buttons, a remote controller, or the like may be used as the operation unit 150, an image processing circuit or the like may be used as the image generating unit 160, and a lamp, a liquid crystal panel, a liquid crystal driving circuit, a zoom lens, a zoom lens driving circuit, a zoom lens motor, a projection lens, and the like may be used as the projecting unit 190.

A computer included in the projector 100 may read a computer program stored in an information storage medium 200 and function as the manual trapezoidal distortion correction unit 164 or the like. As such an information storage medium 200, for example, a CD-ROM, a DVD-ROM, a ROM, a RAM, an HDD, or the like can be applied.

Figure 3:
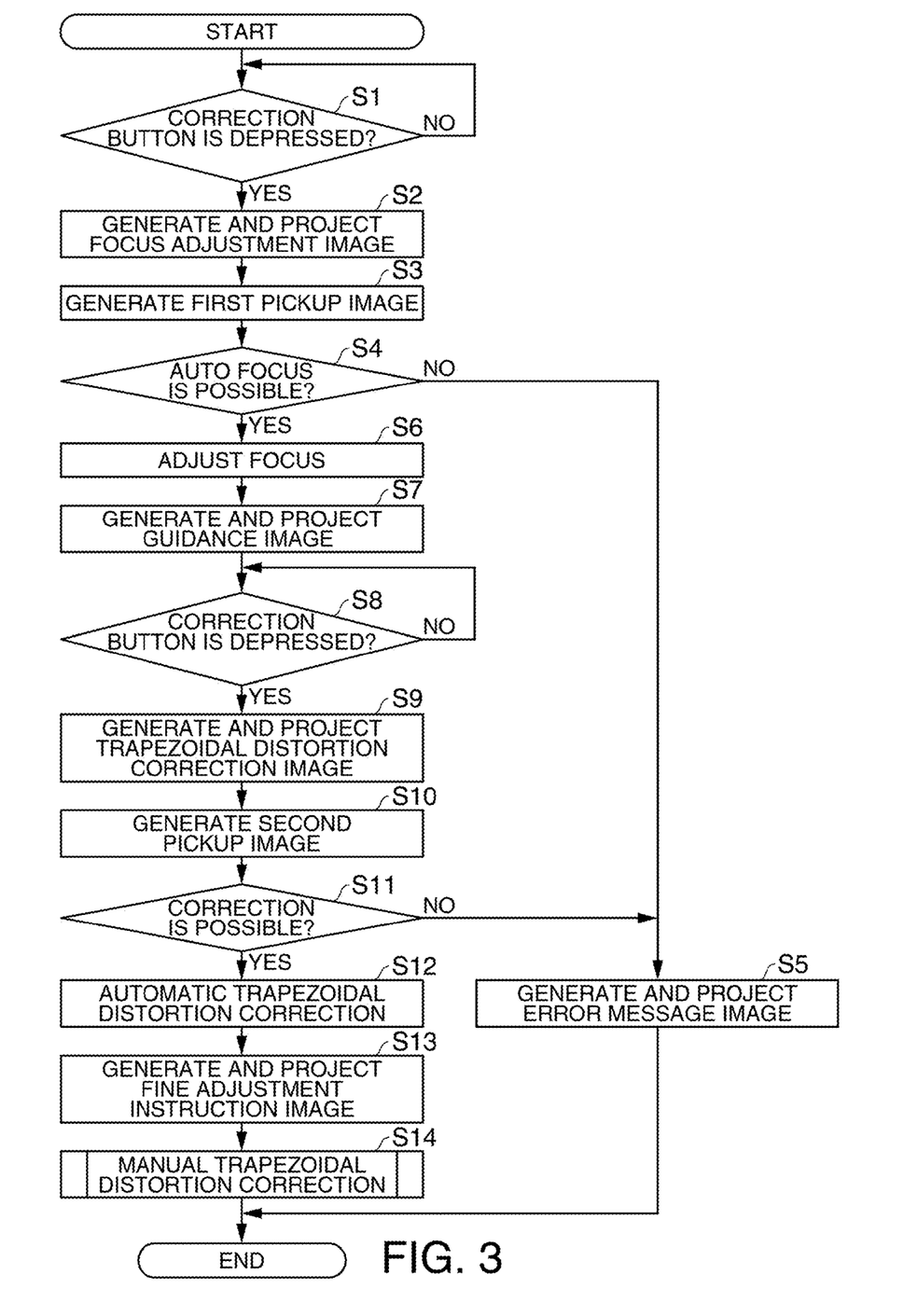
FIG. 3 is a flowchart for explaining a procedure of trapezoidal distortion correction in the first embodiment.

A trapezoidal distortion correction procedure performed by using these units when the correction button is depressed is explained below. FIG. 3 is a flowchart for explaining a trapezoidal distortion correction procedure in the first embodiment. The control unit 110 determines, on the basis of operation information received from the operation unit 150, whether the correction button is pressed (step S1).

When the correction button is pressed, the control unit 110 outputs control information for causing the image generating unit 160 to generate a focus adjustment image to the image generating unit 160. The image generating unit 160 generates a focus adjustment image on the basis of the control information and the image data 124 and the projecting unit 190 projects the focus adjustment image on the screen 10 (step S2).

Figure 4:
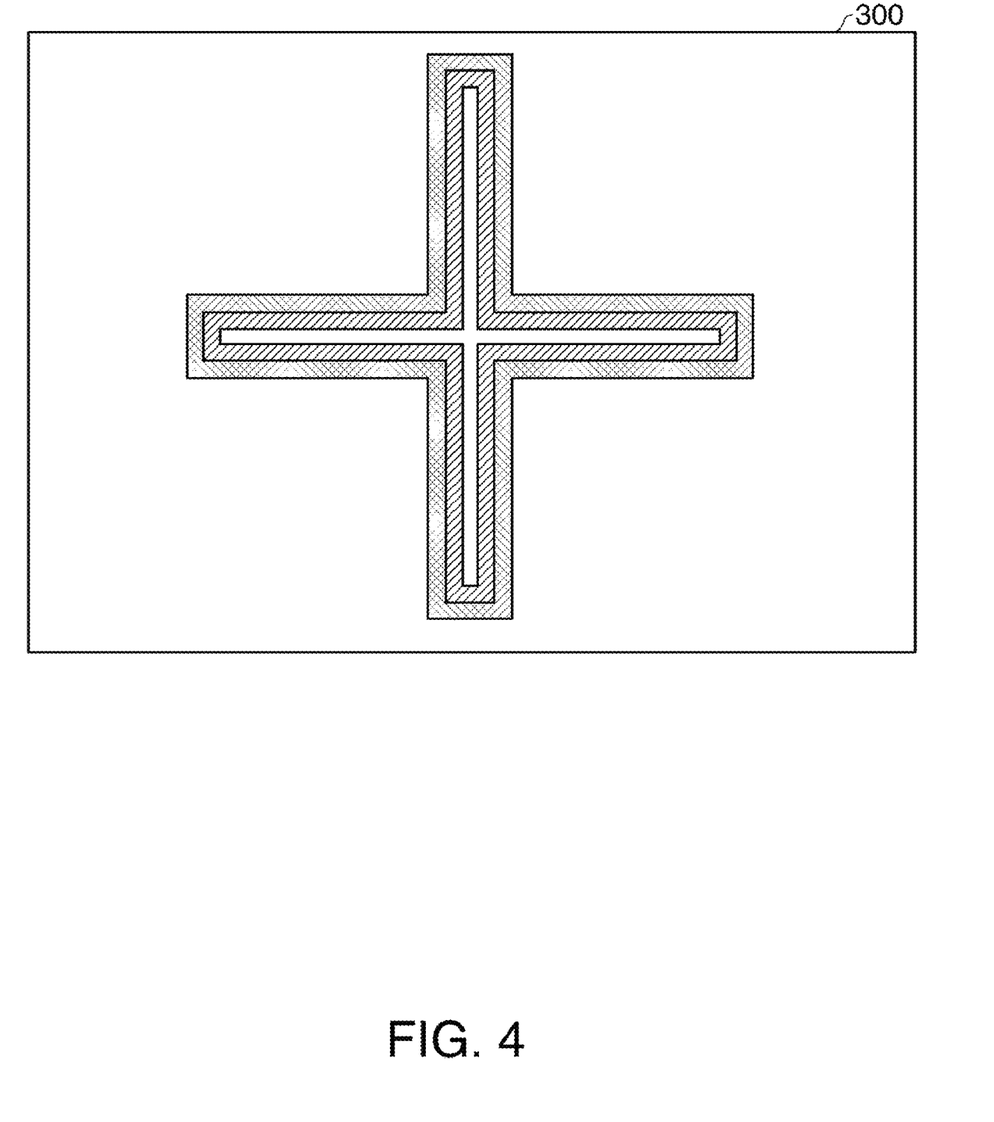
FIG. 4 is a diagram of an example of a focus adjustment image in the first embodiment.

FIG. 4 is a diagram of an example of a focus adjustment image 300 in the first embodiment. The focus adjustment image 300 includes a + shaped pattern image including two orthogonal straight lines. The straight lines included in the pattern image have gradations to be brightest in the center and darkest at the outer edge. For example, in the focus adjustment image 300 shown in FIG. 4, a white area is provided in the center of the lines, a light gray area is provided to surround the white area, and a dark gray area is provided around the light gray area.

A background of the pattern image is an area (an area of white, black, or the like) having a gradation different from that of the area at the outer edge (in this embodiment, the dark gray area) of the pattern image. In FIG. 4, to clearly show the gradations, the pattern image and the width of the lines included in the pattern image are drawn large. However, the pattern image may be smaller than that shown in FIG. 4. The same holds true for a trapezoidal distortion correction image explained later.

The imaging unit 130 picks up an image of the focus adjustment image 300 projected on the screen 10 and generates a first pickup image (step S3). The control unit 110 determines, on the basis of the first pickup image, whether auto focus is possible (step S4). More specifically, for example, the control unit 110 determines, by performing a parabola approximate operation, a center-of-gravity operation, or the like using luminance information or the like of the first pickup image, whether a coordinate of the white area, which is an intersection (a center position) of the straight lines of the + shaped pattern image, included in the first pickup image can be determined to thereby determine whether auto focus is possible.

When auto focus is impossible, the control unit 110 outputs control information for causing the image generating unit 160 to generate an error message image to the image generating unit 160. The image generating unit 160 generates an error message image on the basis of the control information and the image data 124. The projecting unit 190 projects the error message image on the screen 10 (step S5). The error message image is an image showing a character string such as "Measurement is impossible. Please check a location of the projector".

On the other hand, when auto focus is possible, the control unit 110 outputs control information for focus adjustment to the projecting unit 190. More specifically, for example, the control unit 110 determines the center position of the + shaped pattern image as a coordinate of a reference point. This coordinate is a two-dimensional coordinate in an imaging area of the imaging unit 130. When only the focus adjustment is performed, at least one reference point only has to be set.

The control unit 110 applies an arithmetic operation employing an active stereo method, which makes use of a parallax between a projection lens of the projecting unit 190 and an imaging lens of the imaging unit 130, to the two-dimensional coordinate and determines a coordinate of the reference point on the screen 10. This coordinate is a three-dimensional coordinate in a projection coordinate system having a principal point of the projection lens as an origin.

Since the principal point of the projection lens is the origin, the control unit 110 generates, using the three-dimensional coordinate, projection distance information indicating a distance from the principal point of the projection lens to the reference point on the screen 10 (a projection distance).

The control unit 110 outputs, on the basis of the projection distance information, control information for causing the zoom lens driving circuit of the projecting unit 190 to drive the zoom lens motor according to the projection distance. The projecting unit 190 drives the zoom lens motor according to the control information to thereby perform focus adjustment (step S6).

After the focus adjustment, the control unit 110 outputs control information for causing the image generating unit 160 to generate a guidance image to the image generating unit 160. The image generating unit 160 generates a guidance image on the basis of the control information and the image data 124 and the projecting unit 190 projects the guidance image on the screen 10 (step S7).

Figure 5:
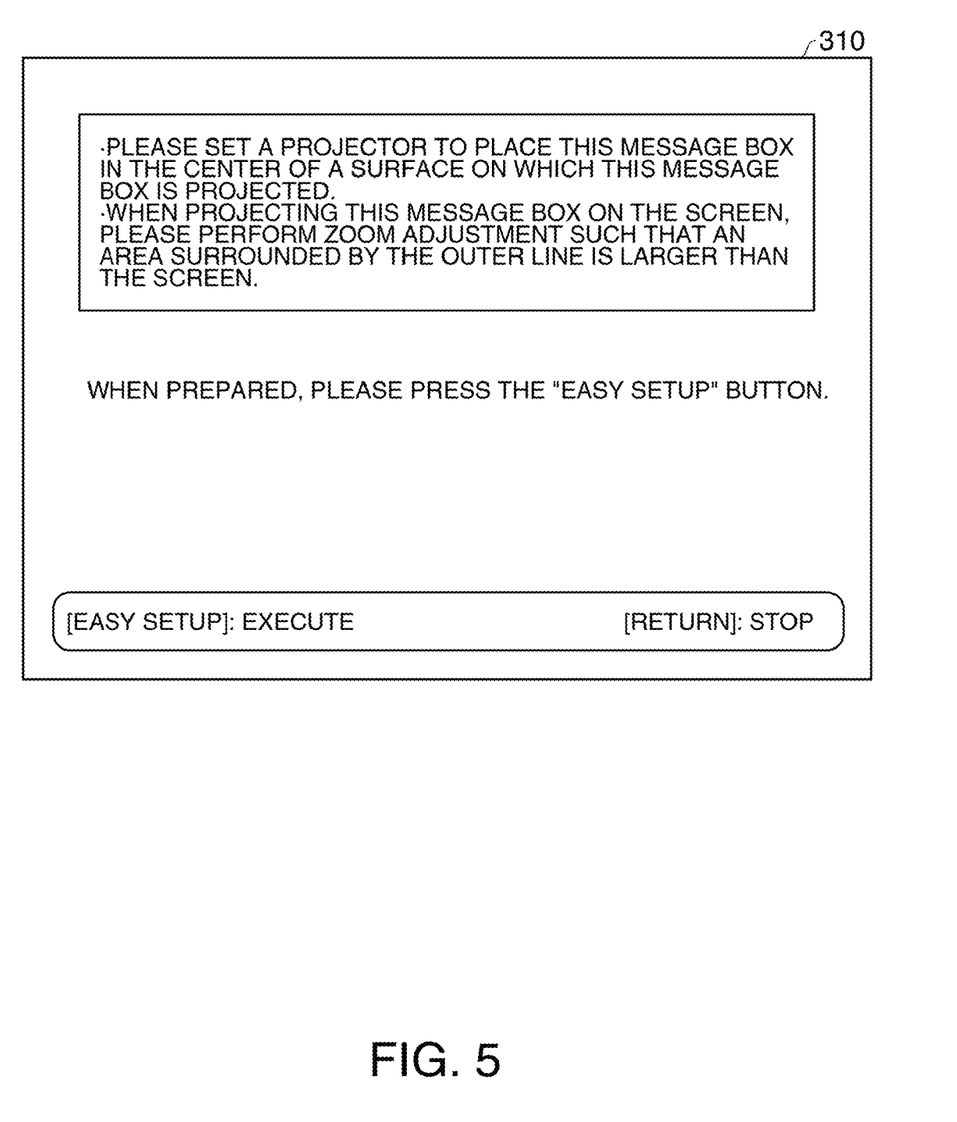
FIG. 5 is a diagram of an example of a guidance image in the first embodiment.

FIG. 5 is a diagram of an example of a guidance image 310 in the first embodiment. The guidance image 310 is an image for causing, for example, by displaying a frame or the like and a character string indicating instruction content, the user to adjust the position of the projector 100. When the adjustment of the position of the projector 100 is completed, the user presses the correction button again.

The control unit 110 determines, on the basis of the operation information received from the operation unit 150, whether the correction button is pressed (step S8). When the correction button is pressed, the control unit 110 outputs control information for causing the image generating unit 160 to generate a trapezoidal distortion correction image to the image generating unit 160. The image generating unit 160 generates a trapezoidal distortion correction image on the basis of the control information and the image data 124 and the projecting unit 190 projects the trapezoidal distortion correction image on the screen 10 (step S9).

Figure 6:
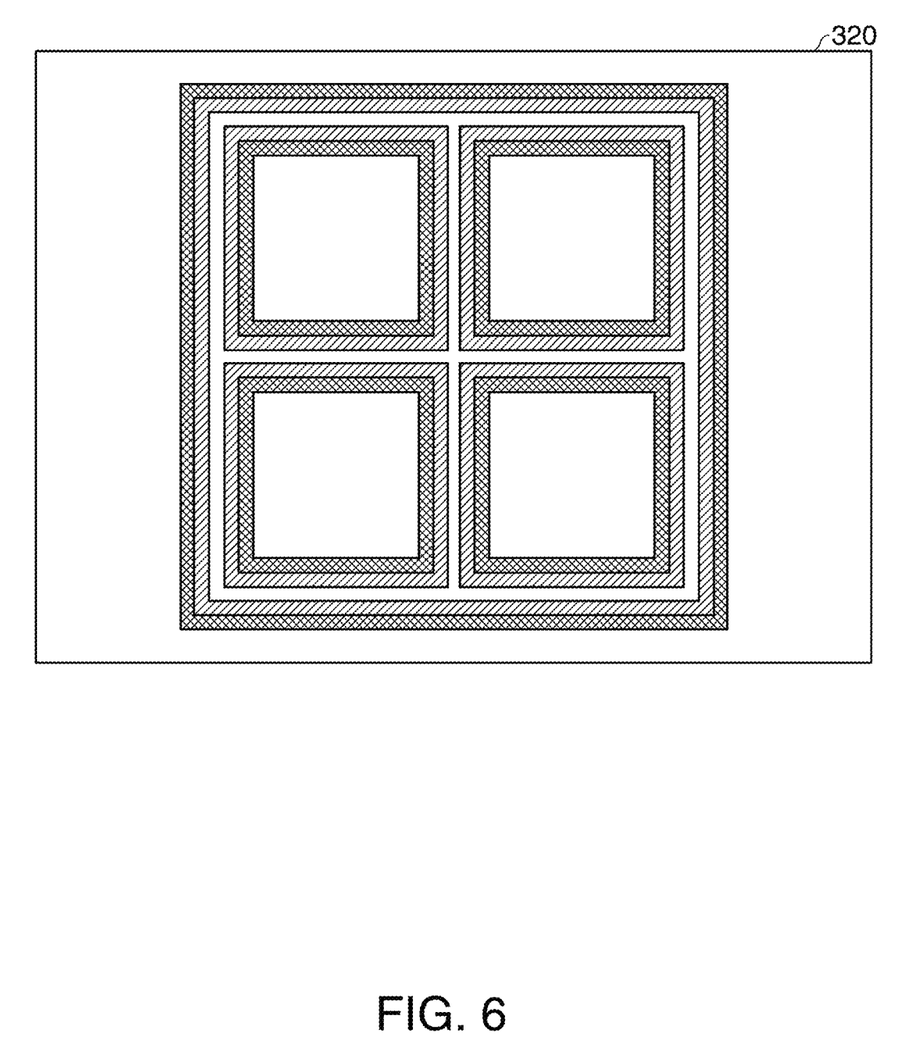
FIG. 6 is a diagram of an example of a trapezoidal distortion correction image in the first embodiment.

FIG. 6 is a diagram of an example of a trapezoidal distortion correction image 320 in the first embodiment. The trapezoidal distortion correction image 320 includes a pattern image having gradations same as the pattern image of the focus adjustment image 300. However, the shape of the pattern image is different from that of the pattern image of the focus adjustment image 300. The pattern image of the trapezoidal distortion correction image 320 is formed in a state in which four rectangles are arranged to be connected in two rows and two columns. In other words, the pattern image is formed in a state in which three straight lines arranged in parallel and at equal intervals in the vertical direction and three straight lines arranged in parallel and at equal intervals in the horizontal direction are orthogonal to each other. The pattern image has nine intersections in total.

The imaging unit 130 picks up an image of the trapezoidal distortion correction image 320 projected on the screen and generates a second pickup image (step S10). The control unit 110 determines, on the basis of the second pickup image, whether the automatic trapezoidal distortion correction is possible (step S11).

Specifically, for example, when a condition that an area (a frame) of the screen 10 in the second pickup image can be determined or a condition that an angle of a pattern image of the trapezoidal distortion correction image 320 can be determined in the second pickup image is satisfied, the control unit 110 determined that the automatic trapezoidal distortion correction is possible.

When the automatic trapezoidal distortion correction is impossible, the control unit 110 causes the image generating unit 160 to generate the error message image and the projecting unit 190 projects the error message image on the screen 10 (step S5).

On the other hand, when the automatic trapezoidal distortion correction is possible, the control unit 110 outputs control information for causing the automatic trapezoidal distortion correction unit 162 to perform the automatic trapezoidal distortion correction to the automatic trapezoidal distortion correction unit 162 and the automatic trapezoidal distortion correction unit 162 performs the automatic trapezoidal distortion correction on the basis of the control information (step S12).

More specifically, for example, the automatic trapezoidal distortion correction unit 162 performs the parabola approximation operation, the center-of-gravity operation, or the like using luminance information or the like of the second pickup image to thereby determine coordinates of white areas, which are the nine intersections, included in the pickup image as coordinates of reference points. The coordinates are two-dimensional coordinates in the imaging area of the imaging unit 130.

The automatic trapezoidal distortion correction unit 162 applies an arithmetic operation employing the active stereo method, which makes use of the parallax between the projection lens of the projecting unit 190 and the imaging lens of the imaging unit 130, to the two-dimensional coordinates and determines coordinates of the reference points on the screen 10. The coordinates are three-dimensional coordinates in the projection coordinate system having the principal point of the projection lens as the origin.

The automatic trapezoidal distortion correction unit 162 generates projection angle information indicating relative tilts (projection angles) in the vertical direction and the horizontal direction of projected light and the screen 10 using at least three three-dimensional coordinates among the three-dimensional coordinates of the nine reference points.

The automatic trapezoidal distortion correction unit 162 grasps a distortion state of an image on the basis of the projection angle information and sets, according to the distortion state, a correction target area that is a desirable image forming area after distortion correction on the liquid crystal panel. The image generating unit 160 generates an image in the image forming area, whereby the projecting unit 190 can project the image with distortion corrected.

The control unit 110 outputs control information for causing the image generating unit 160 to generate a fine adjustment instruction image after the automatic trapezoidal distortion correction to the image generating unit 160. The image generating unit 160 generates a fine adjustment instruction image on the basis of the control information and the image data 124 and the projecting unit 190 projects the fine adjustment instruction image on the screen 10 (step S13).

Figure 7:
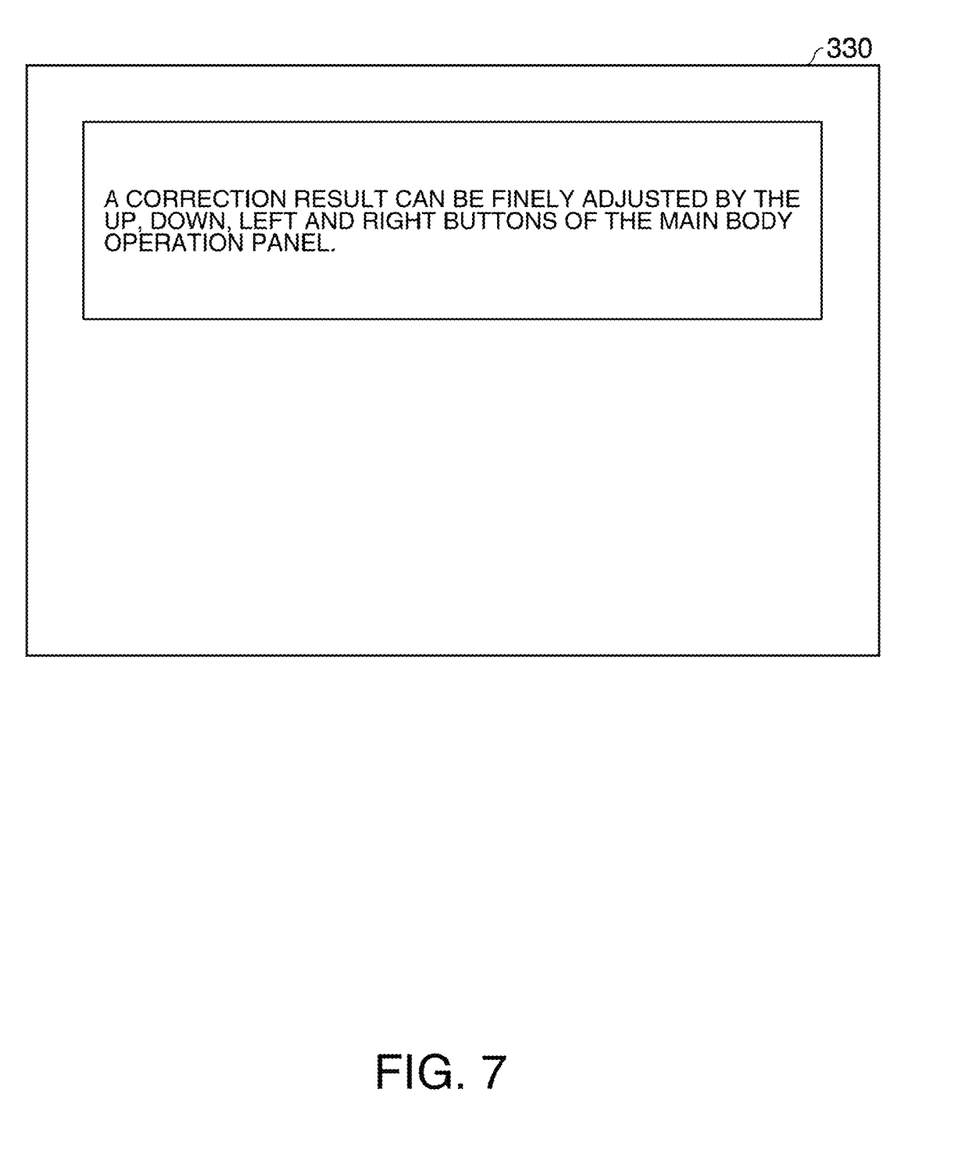
FIG. 7 is a diagram of an example of a fine adjustment instruction image in the first embodiment.

FIG. 7 is a diagram of an example of a fine adjustment instruction image 330 in the first embodiment. The fine adjustment instruction image 330 is, for example, an image indicating that the position, the shape, and the like of a present image can be finely adjusted by pressing the up, down, left, and right operation buttons of the main body of the projector 100.

The control unit 110 outputs control information for causing the manual trapezoidal distortion correction unit 164 to perform the manual trapezoidal distortion correction after the projection of the fine adjustment instruction image 330 to the manual trapezoidal distortion correction unit 164. The manual trapezoidal distortion correction unit 164 performs the manual trapezoidal distortion correction on the basis of the control information and the like (step S14). A manual trapezoidal distortion correction procedure is explained below.

Figure 8:
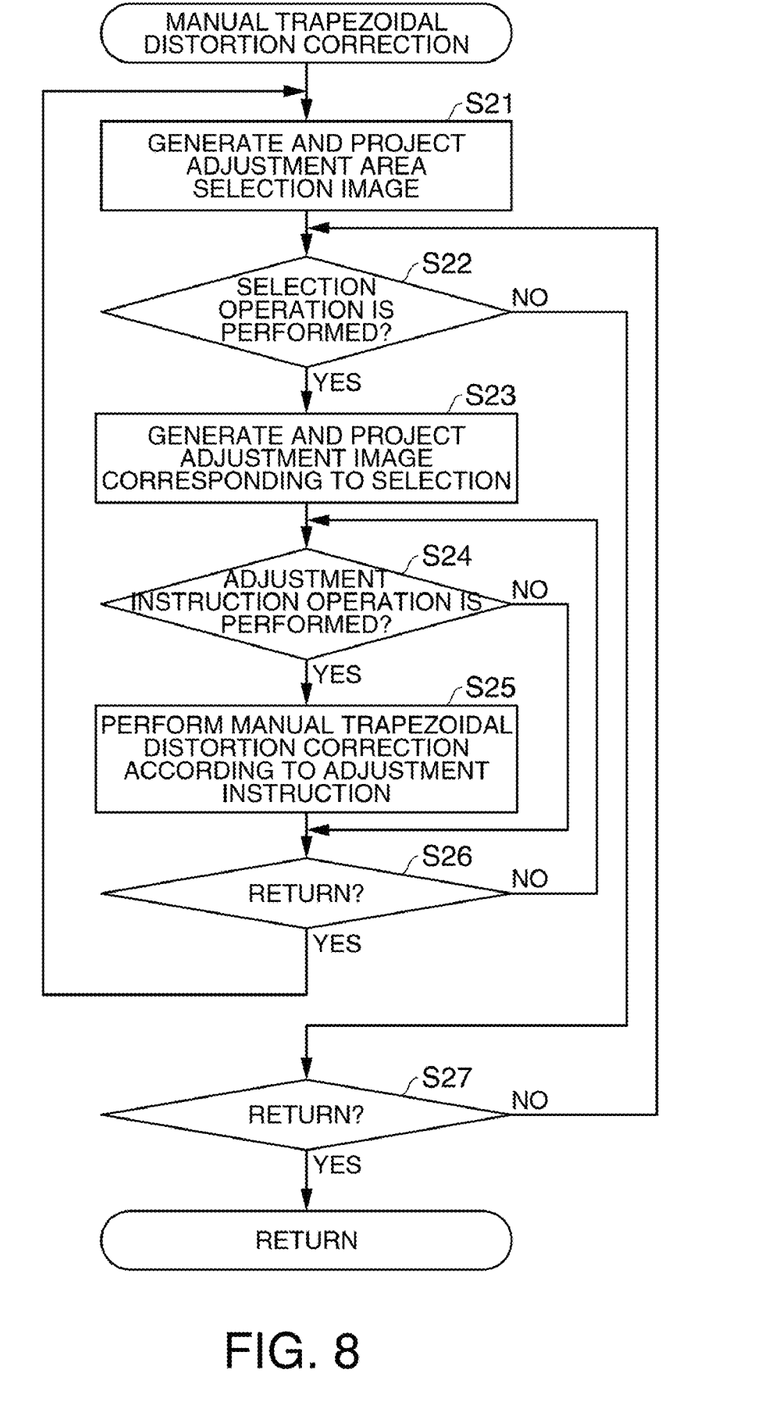
FIG. 8 is a flowchart for explaining a procedure of manual trapezoidal distortion correction in the first embodiment.

FIG. 8 is a flowchart for explaining a manual trapezoidal distortion correction procedure in the first embodiment. The manual trapezoidal distortion correction unit 164 generates an adjustment area selection image and the projecting unit 190 projects the adjustment area selection image on the screen 10 (step S21).

Figure 9:
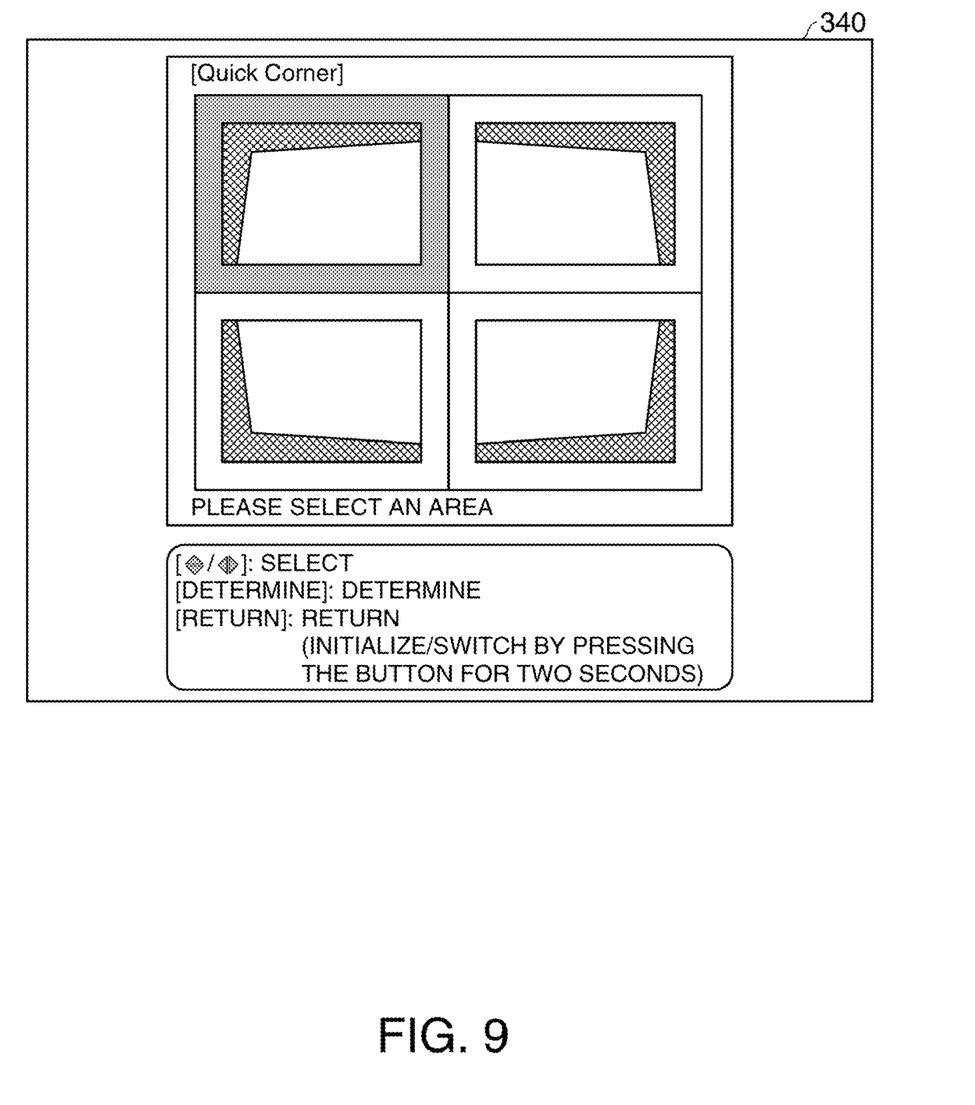
FIG. 9 is a diagram of an example of an adjustment area selection image in the first embodiment.

FIG. 9 is a diagram of an example of an adjustment area selection image 340 in the first embodiment. The adjustment area selection image 340 is, for example, an image for causing the user to select four areas on the upper left, upper right, lower left, and lower right corresponding to four vertexes of an image. In a state shown in FIG. 9, the upper left area is selected.

The control unit 110 determines, on the basis of operation information received from the operation unit 150, whether selection operation is performed (step S22). When the selection operation is performed, the control unit 110 outputs information indicating content of the selection operation to the manual trapezoidal distortion correction unit 164.

The manual trapezoidal distortion correction unit 164 generates an adjustment image corresponding to the selection on the basis of the information and the projecting unit 190 projects the adjustment image on the screen 10 (step S23).

Figure 10:
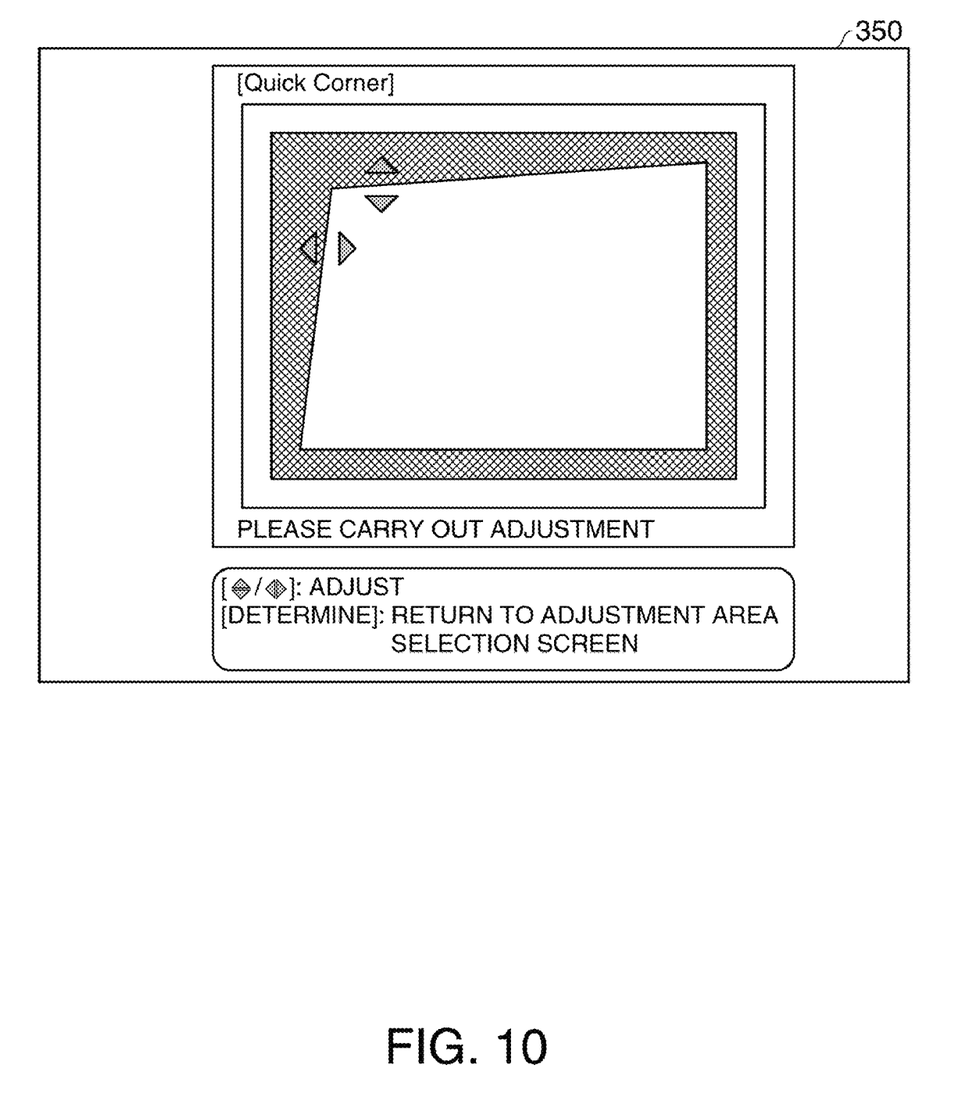
FIG. 10 is a diagram of an example of an adjustment image in the first embodiment.

FIG. 10 is a diagram of an example of an adjustment image 350 in the first embodiment. The adjustment image 350 is an image for adjusting, with the up, down, left, and right buttons, the position of a selected vertex among four vertexes of an image. For example, in the example shown in FIG. 10, an upper left vertex is selected.

The control unit 110 determines, on the basis of operation information received from the operation unit 150, whether adjustment instruction operation (e.g., depression of any one of the up, down, left, and right buttons) is performed (step S24). When the adjustment instruction operation is performed, the control unit 110 outputs information indicating content of the adjustment instruction operation to the manual trapezoidal distortion correction unit 164.

The manual trapezoidal distortion correction unit 164 performs manual trapezoidal distortion correction corresponding to the adjustment instruction on the basis of the information (step S25). More specifically, for example, the manual trapezoidal distortion correction unit 164 updates a coordinate of the correction target area according to the adjustment instruction.

The control unit 110 determines, on the basis of the operation information received from the operation unit 150, whether a return button of the remote controller or the like is pressed (step S26). When the return button is pressed, the control unit 110 causes the manual trapezoidal distortion correction unit 164 to generate the adjustment area selection image 340. On the other hand, when the return button is not pressed, the projector 100 repeatedly executes the processing in steps S24 to S26.

The control unit 110 determines, on the basis of the operation information received from the operation unit 150, whether the return button of the remote controller or the like is pressed in a state in which the adjustment area selection image 340 is displayed (step S27). When the return button is pressed, the projector 100 ends the manual trapezoidal distortion correction. On the other hand, when the return button is not pressed, the projector 100 repeatedly executes the processing in steps S21 to S27.

As explained above, according to this embodiment, the projector 100 performs, irrespectively of the manual trapezoidal distortion correction system indicated by the setting data 122, adjustment of the vertex position of the display planned area to thereby enable the user to manually perform the trapezoidal distortion correction. Consequently, the user can more easily perform the trapezoidal distortion correction manually after the automatic trapezoidal distortion correction.

The manual trapezoidal distortion correction after the automatic trapezoidal distortion correction is correction in a state in which trapezoidal distortion cannot be corrected by the automatic trapezoidal distortion correction. Therefore, it is necessary that the user can perform fine adjustment. The system by the adjustment of four vertexes is appropriate as a system for the manual trapezoidal distortion correction after the automatic trapezoidal distortion correction because finer adjustment can be performed compared with the system for deforming distortion in a trapezoidal shape in the vertical direction or the horizontal direction.

According to this embodiment, the projector 100 can perform the trapezoidal distortion correction in an appropriate location by causing, by projecting the guidance image 310, the user to check a location of the projector 100 before the trapezoidal distortion correction.

According to this embodiment, the projector 100 can project, by projecting the focus adjustment image 300 before the projection of the guidance image 310, the guidance image 310 in a state in which a focus is adjusted. Therefore, since the user can easily visually recognize characters and the like, a guidance can be more appropriately given to the user.

According to this embodiment, the projector 100 projects the focus adjustment image 300 and the trapezoidal distortion correction image 320 including the pattern images having gradations. Therefore, since an image having at least three different gradations is included in a pickup image, even in a state in which a focus of the pickup image is inappropriate, a reference point as a reference for a projection distance and the like can be easily determined from the difference among the gradations. Therefore, the focus adjustment and the trapezoidal distortion correction can be performed in a shorter time and with higher accuracy.

Other Embodiments

The invention is not limited to the embodiment explained above and various modifications of the embodiment are possible. For example, the focus adjustment image 300 and the trapezoidal distortion correction image 320 are not limited to the shapes explained above. For example, the pattern image of the trapezoidal distortion correction image 320 may be an image with the straight lines extending beyond the outer peripheral line of the pattern image shown in FIG. 6 (e.g., when the pattern image is a square, an image having a shape of #).

The pattern image explained above has three gradations. However, the pattern image may have four or more gradations. In the pattern image explained above, the areas of the same gradation are arranged on both the sides of the white area. However, an area of a different gradation may be arranged only on one side. For example, the pattern image may be a linear image in which the leftmost area is a dark gray area, the center area is a light gray area, and the rightmost area is a white area.

A trapezoidal distortion correction image or the like including plural pattern images in one image may be adopted. For example, a trapezoidal distortion correction image including a + shaped pattern image for each reference point may be adopted. The number of reference points for the trapezoidal distortion correction or the like is not limited to nine and may be equal to or smaller than eight or may be equal to or larger than ten.

The shape of the pattern image is not limited to the linear shape and may be a curved shape or a dot shape. The lines of the pattern image do not have to be orthogonal to each other and may be tilted obliquely. In other words, the pattern image may have a x shape rather than the + shape.

Methods for the focus adjustment and the trapezoidal distortion correction are not limited to the methods of the embodiment. For example, the projector 100 may generate plural pickup images at different viewpoints using plural imaging units and perform an arithmetic operation employing a passive stereo method to calculate a three-dimensional coordinate of a reference point of a pattern image on the screen 10.

A method of the trapezoidal distortion correction is not limited to the method of the embodiment. For example, the projector 100 may pick up an image of the screen 10 in a non-projected state, set a disappearance point on the basis of the positions and the tilts of the sides of the screen 10 in a pickup image, and project and convert a two-dimensional coordinate in a camera coordinate system of the disappearance point into a three-dimensional coordinate in a projection coordinate system to thereby grasp a distortion state of an image.

The projector 100 may generate a differential image between a pickup image at the time of no projection or at the time of projection of a single-color image of black and the pickup image of the pattern image and determine, for example, the coordinate of the reference point using the differential image. Even when noise such as external light is included in a pickup image, the projector 100 can suppress the influence of the noise and determine, for example, the coordinate of the reference point by using the differential image.

The projection of the focus adjustment image 300, the projection of the guidance image 310, and the projection of the fine adjustment instruction image 330 are not essential elements for performing the trapezoidal distortion correction. The projector 100 may perform the trapezoidal distortion correction without projecting these images.

The projection target area is not limited to the area of the screen 10 and may be an area of, for example, a blackboard, a whiteboard, or a wall.

The projector 100 is not limited to a liquid crystal projector (a transmission type or a reflection type such as LCOS) and may be, for example, a projector employing DMD (Digital Micromirror Device). DMD is a trademark of Texas Instruments Incorporated in the United States. The functions of the projector 100 may be distributed to plural apparatuses (e.g., a PC and a projector).

What is claimed is:

1. A projector comprising:
   a storing unit that stores setting data indicating a type of manual trapezoidal distortion correction system selected out of plural types of manual trapezoidal distortion correction systems when manual trapezoidal distortion correction is instructed;
   an operation unit that generates operation information;
   an imaging unit that picks up an image of a projection target area and generates a pickup image;
   an automatic trapezoidal distortion correction unit that performs automatic trapezoidal distortion correction on the basis of operation information indicating an automatic trapezoidal distortion correction instruction and the pickup image;
   a projecting unit that projects, after the automatic trapezoidal distortion correction is performed, irrespectively of the type of manual trapezoidal distortion correction system indicated by the setting data, an adjustment instruction image for urging adjustment of a vertex position of a display planned area of the image in the projection target area on the projection target area; and
   a manual trapezoidal distortion correction unit that performs manual trapezoidal distortion correction on the basis of operation information indicating an adjustment instruction for the vertex position.

2. The projector according to claim 1, wherein the projecting unit projects a fine adjustment instruction image for indicating that a present image can be finely adjusted on the basis of the operation information before the projecting unit projects the adjustment instruction image.

3. The projector according to claim 1, wherein the projecting unit projects a guidance image for urging check of a location of the projector on the projection target area before the imaging by the imaging unit is performed.

4. The projector according to claim 3, wherein
   the projector includes a control unit,
   the projecting unit projects a focus adjustment image on the projection target area before the projection of the guidance image, and
   the control unit causes the projecting unit to perform focus adjustment on the basis of the focus adjustment image included in the pickup image.

5. The projector according to claim 4, wherein
   the focus adjustment image includes at least one pattern image having at least three different gradations, and
   the control unit causes the projecting unit to perform the focus adjustment on the basis of a three-dimensional coordinate of at least one point concerning the pattern image included in the pickup image.

6. A computer program product embodied in at least one non-transitory computer readable medium and comprising computer instructions executable by a computer of a projector, which controls a storing unit, an imaging unit, and a projecting unit, to perform the function of:
   causing the storing unit to store setting data indicating a type of manual trapezoidal distortion correction system selected out of plural types of manual trapezoidal distortion correction systems when manual trapezoidal distortion correction is instructed;
   causing the imaging unit to pick up an image of a projection target area and generate a pickup image;
   performing automatic trapezoidal distortion correction on the basis of operation information indicating an automatic trapezoidal distortion correction instruction and the pickup image;
   causing the projecting unit to project, after the automatic trapezoidal distortion correction is performed, irrespectively of the type of manual trapezoidal distortion correction system indicated by the setting data, an adjustment instruction image for urging adjustment of a vertex position of a display planned area of the image in the projection target area on the projection target area; and
   performing manual trapezoidal distortion correction on the basis of operation information indicating an adjustment instruction for the vertex position.

7. A trapezoidal distortion correcting method for a computer of a projector, which controls a storing unit, an imaging unit, and a projecting unit, the method comprising the steps of:
   allowing the computer to cause the storing unit to store setting data indicating a type of manual trapezoidal distortion correction system selected out of plural types of manual trapezoidal distortion correction systems when manual trapezoidal distortion correction is instructed;
   allowing the computer to cause the imaging unit to pick up an image of a projection target area and generate a pickup image;
   allowing the computer to perform automatic trapezoidal distortion correction on the basis of operation information indicating an automatic trapezoidal distortion correction instruction and the pickup image;
   allowing the computer to cause the projecting unit to project, after the automatic trapezoidal distortion correction is performed, irrespectively of the type of manual trapezoidal distortion correction system indicated by the setting data, an adjustment instruction image for urging adjustment of a vertex position of a display planned area of the image in the projection target area on the projection target area; and
   allowing the computer to perform manual trapezoidal distortion correction on the basis of operation information indicating an adjustment instruction for the vertex position.

* * * * *